(12) United States Patent
Pan et al.

(10) Patent No.: US 12,124,248 B1
(45) Date of Patent: Oct. 22, 2024

(54) METHOD AND APPARATUS FOR PROCESSING ACCELERATED TEST DATA BASED ON MULTIPLE PERFORMANCE DEGRADATION, AND COMPUTER DEVICE

(71) Applicant: CHINA ELECTRONIC PRODUCT RELIABILITY AND ENVIRONMENTAL TESTING RESEARCH INSTITUTE, Guangzhou (CN)

(72) Inventors: Guangze Pan, Guangzhou (CN); Dan Li, Guangzhou (CN); Bochen Chen, Guangzhou (CN); Lijun Sun, Guangzhou (CN); Yuanhang Wang, Guangzhou (CN); Wenwei Liu, Guangzhou (CN); Jianfeng Yang, Guangzhou (CN); Xiaojian Ding, Guangzhou (CN)

(73) Assignee: CHINA ELECTRONIC PRODUCT RELIABILITY AND ENVIRONMENTAL TESTING RESEARCH INSTITUTE, Guangzhou (CN)

( * ) Notice: Subject to any disclaimer, the term of this patent is extended or adjusted under 35 U.S.C. 154(b) by 0 days.

(21) Appl. No.: 18/625,748

(22) Filed: Apr. 3, 2024

(30) Foreign Application Priority Data

Apr. 4, 2023  (CN) .......................... 202310349194.5

(51) Int. Cl.
*G05B 19/418* (2006.01)

(52) U.S. Cl.
CPC .................. *G05B 19/41875* (2013.01); *G05B 2219/32368* (2013.01)

(58) Field of Classification Search
CPC ... G06F 30/20; G06F 17/18; G05B 19/41875; G05B 15/02; G05B 23/0283; G01R 31/003
(Continued)

(56) References Cited

U.S. PATENT DOCUMENTS 7,149,673 B1 * 12/2006 Brand ................... G06F 11/008
714/724
7,260,509 B1 *  8/2007 Brand ................... G06Q 10/04
702/56
(Continued)

FOREIGN PATENT DOCUMENTS

| CN | 108959676 A | * 12/2018 | ............. G06F 17/18 |
| CN | 111814301 A | * 10/2020 | ............. G06F 30/20 |

(Continued)

OTHER PUBLICATIONS

Statistical analysis method for accelerated life testing with incomplete data and competing failure modes; Pan et al.; Microelectronics Reliability 126 (2021) 114248; 6 pages; 2021 (Year: 2021).*

(Continued)

*Primary Examiner* — Ronald D Hartman, Jr.
(74) *Attorney, Agent, or Firm* — Quarles & Brady LLP (57) ABSTRACT

The present disclosure relates to a method and an apparatus for processing accelerated test data based on multiple performance degradation, and a device. The method includes: a computer device obtaining multiple performance parameter values of a target product, and determining an association relationship among the performance parameter values, the association relationship including an independent coexistence relationship and a backup relationship, and the performance parameter values being obtained by applying an acceleration stress to the target product in an acceleration experiment; the computer device determining a reliability estimation model corresponding to the association relation-
(Continued)

ship based on the association relationship, and according to the reliability estimation model and each performance parameter value, obtaining a reliability function of multiple performance degradation corresponding to the target product; the computer device obtaining, according to the reliability function of multiple performance degradation, a product reliability estimation index corresponding to the target product under normal stress.

7 Claims, 3 Drawing Sheets

(58) Field of Classification Search
USPC .......................................................... 700/109
See application file for complete search history.

(56) References Cited

U.S. PATENT DOCUMENTS

| | | | | |
|---|---|---|---|---|
| 10,168,685 | B2* | 1/2019 | Burns | G05B 19/0428 |
| 11,150,292 | B1* | 10/2021 | Variyam | G01R 31/31932 |
| 11,900,287 | B2* | 2/2024 | Turney | G06Q 10/06315 |
| 2019/0138926 | A1* | 5/2019 | Huang | G06F 30/20 |
| 2023/0417651 | A1* | 12/2023 | Byun | G01N 17/00 |

FOREIGN PATENT DOCUMENTS

| | | | | |
|---|---|---|---|---|
| CN | 112069697 | A * | 12/2020 | G06F 30/20 |
| CN | 113946986 | A * | 1/2022 | |
| CN | 115630490 | A * | 1/2023 | |
| CN | 115809569 | A * | 3/2023 | |
| CN | 115841046 | | 3/2023 | |

OTHER PUBLICATIONS

Statistical Analysis on Accelerated Degradation Test Data Based on Multiple Performance Parameters; Pan et al.; Advanced Materials Research Online: Jan. 3, 2012 ISSN: 1662-8985, vols. 430-432, pp. 1417-1423 doi:10.4028/www.scientific.net/AMR.430-432.1417; 7 pages; published Jan. 3, 2021.*
Office Action, Chinese Patent Application No. 202310349194.5, May 19, 2023, with English translation.
Grant Decision, Chinese Patent Application No. 202310349194.5, Jun. 5, 2023, with English translation.

* cited by examiner

METHOD AND APPARATUS FOR PROCESSING ACCELERATED TEST DATA BASED ON MULTIPLE PERFORMANCE DEGRADATION, AND COMPUTER DEVICE

CROSS-REFERENCE TO RELATED APPLICATIONS

The present application claims priority to Chinese patent application No. 2023103491945, filed on Apr. 4, 2023, the entire content of which is incorporated herein by reference.

TECHNICAL FIELD

The present disclosure relates to the field of data analysis technology, and in particular to a method and an apparatus for processing accelerated test data based on multiple performance degradation, and a computer device.

BACKGROUND

With the increasing requirements for product quality and reliability, conventional reliability tests based on fault data statistics no longer meet the needs for rapid estimation of product reliability during product development and production.

In related technologies, accelerated tests are introduced in the process of product reliability estimation. Accelerated test is to accelerate product failure by strengthening test conditions without altering the product failure mechanism, so as to obtain necessary information for product reliability estimation in a shorter period of time.

SUMMARY

In a first aspect, the present disclosure provides a method for processing accelerated test data based on multiple performance degradation. The method includes:
  obtaining multiple performance parameter values of a target product, and determining an association relationship among the performance parameter values, the association relationship including an independent coexistence relationship and a backup relationship, and each performance parameter value being obtained by applying an acceleration stress to the target product in an accelerated test;
  determining a reliability estimation model corresponding to the association relationship based on the association relationship, and according to the reliability estimation model and each performance parameter value, obtaining a reliability function of multiple performance degradation corresponding to the target product, the reliability estimation model including a non-backup coupling competition model, a backup coupling competition model, or a fusion competition model; and
  obtaining, according to the reliability function of multiple performance degradation, a product reliability estimation index corresponding to the target product under a normal stress, the product reliability estimation index including a mean time between failures of the product, a failure rate function of the product and a failure rate of the product.

Obtaining, according to the reliability estimation model and each of the performance parameter values, the reliability function of multiple performance degradation corresponding to the target product includes:
  determining, according to the performance parameter value and a preset selection condition, a target time transition function corresponding to the performance parameter value from multiple candidate time transition functions, the performance parameter value changing linearly and/or non-linear with a time change represented by the target time transition function;
  obtaining, by a gamma distribution function, a reliability function of single performance degradation based on the performance parameter value and the target time transition function; and
  obtaining, according to each reliability function of single performance degradation and the reliability estimation model, the reliability function of multiple performance degradation.

An expression of the gamma distribution function is as follows:

$$\begin{cases} y(t) \sim G(c\rho(t), d) \\ d \sim G(e, f) \end{cases}$$

where $y(t)$ represents each performance parameter value, $\rho(t)$ represents the target time transition function, and $c$, $e$, and $f$ represent unknown parameters to be solved.

An expression of the reliability function of single performance degradation of the target product is as follows:

$$R(t) = H_{2c\rho(t), 2e}\left(\frac{eg}{cf\rho(t)}\right)$$

where $R(t)$ represents the reliability function of single performance degradation, $g$ represents a failure threshold, $H(\cdot)$ represents a F distribution function, $2c\rho(t)$, $2e$ represents a degree of freedom of the F distribution function, and $$\frac{eg}{cf\rho(t)}$$

represents an independent variable of the F distribution function.

In an embodiment, obtaining, according to each reliability function of single performance degradation and the reliability estimation model, the reliability function of multiple performance degradation, includes: substituting each reliability function of single performance degradation into a reliability function calculation formula corresponding to the reliability estimation model to obtain the reliability function of multiple performance degradation. The reliability function calculation formula includes a connection function term, and the connection function term is configured to represent a connection relationship among the performance parameter values that have a non-independent relationship in the multiple performance parameter values.

In an embodiment, obtaining, according to the reliability function of multiple performance degradation, the product reliability estimation index corresponding to the target product under the normal stress, includes: processing the reliability function of multiple performance degradation to obtain an initial reliability estimation index; and obtaining an acceleration factor of the target product corresponding to the acceleration stress, and multiplying the acceleration factor by the initial reliability estimation index to obtain the product reliability estimation index.

In an embodiment, the failure rate function is configured as a ratio of failed products to a total number of products at a time node under the normal stress.

In a second aspect, the present disclosure also provides an apparatus for processing accelerated test data based on multiple performance degradation. The apparatus includes: a determination module configured to obtain multiple performance parameter values of a target product, and determine an association relationship among the performance parameter values, the association relationship including an independent coexistence relationship and a backup relationship, and each performance parameter value being obtained by applying an acceleration stress to the target product in an accelerated test; a first obtaining module configured to determine a reliability estimation model corresponding to the association relationship based on the association relationship, and according to the reliability estimation model and each performance parameter value, obtain a reliability function of multiple performance degradation corresponding to the target product; and a second obtaining module configured to obtain, according to the reliability function of multiple performance degradation, a product reliability estimation index corresponding to the target product under a normal stress.

The first obtaining module is specifically configured to:
 determine, according to each performance parameter value and a preset selection condition, a target time transition function corresponding to the performance parameter value from multiple candidate time transition functions, the performance parameter value changing linearly and/or non-linear with a time change represented by the target time transition function;
 obtain, by a gamma distribution function, a reliability function of single performance degradation based on the performance parameter value and the target time transition function; and
 obtain, according to each reliability function of single performance degradation and the reliability estimation model, the reliability function of multiple performance degradation;

An expression of the gamma distribution function is as follows:

$$\begin{cases} y(t) \sim G(c\rho(t), d) \\ d \sim G(e, f) \end{cases}$$

where y(t) represents each performance parameter value, ρ(t) represents the target time transition function, and c, e, and f represent unknown parameters to be solved.

An expression of the reliability function of single performance degradation of the target product is as follows:

$$R(t) = H_{2c\rho(t),2e}\left(\frac{eg}{cf\rho(t)}\right)$$

where R(t) represents the reliability function of single performance degradation, g represents a failure threshold, H(•) represents a F distribution function, 2cρ(t), 2e represents a degree of freedom of the F distribution function, and $$\frac{eg}{cf\rho(t)}$$

represents an independent variable of the F distribution function.

In a third aspect, the present disclosure also provides a computer device. The computer device includes a memory and a processor. The memory stores a computer program. When the computer program is executed by the processor, steps of the method described in any one of the embodiments in the first aspect are implemented.

In a fourth aspect, the present disclosure also provides a computer-readable storage medium. The computer-readable storage medium has a computer program stored thereon, and when the computer program is executed by a processor, steps of the method described in any one of the embodiments in the first aspect are implemented.

In a fifth aspect, the present disclosure also provides a computer program product. The computer program product includes a computer program. When the computer program is executed by a processor, steps of the method described in any one of the embodiments in the first aspect are implemented.

DETAILED DESCRIPTION OF THE EMBODIMENTS

In order to make the purpose, technical solutions and advantages of the present disclosure more clear, the present disclosure will be further described in detail below with reference to the drawings and embodiments. It should be understood that the specific embodiments described here are only for the purpose of explaining the present disclosure and are not intended to limit the present disclosure.

A brief description of the implementation environment involved in a method for processing accelerated test data based on multiple performance degradation provided by the embodiments of the present disclosure is provided below.

The method for processing accelerated test data based on multiple performance degradation provided by the embodiments of the present disclosure may be performed by a computer device, and the computer device may be a terminal or a server. The terminal can be, but is not limited to, various personal computers, laptops, smartphones, tablets, Internet of Things devices, portable wearable devices, and medical electronic equipment. The Internet of Things devices can be smart speakers, smart TVs, smart air conditioners, smart in-vehicle devices, etc. Portable wearable devices can be smart watches, smart bracelets, head-mounted devices, etc. The server may be implemented as an independent server or a server cluster composed of multiple servers.

Figure 1:
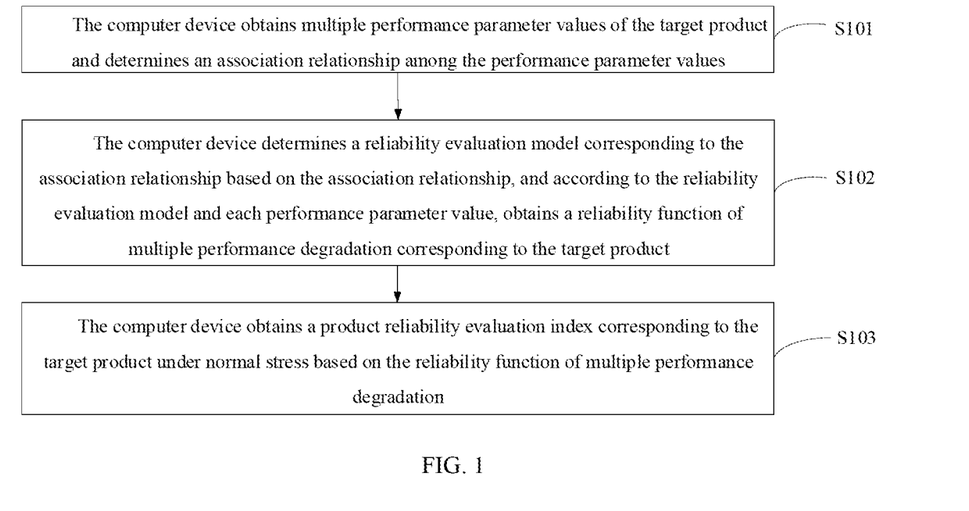
FIG. 1 is a schematic flow diagram of a method for processing accelerated test data based on multiple performance degradation in an embodiment.

In an embodiment, as shown in FIG. 1, a method for processing accelerated test data based on multiple performance degradation is provided, which is applied to a computer device. Taking the computer device that is a terminal as an example for illustration, the method includes the following steps.

In step 101, the computer device obtains multiple performance parameter values of a target product and determines an association relationship among the performance parameter values.

In the embodiments of the present disclosure, each performance parameter value is obtained under the condition of applying acceleration stress to the target product in an acceleration experiment. The performance parameter value refers to the present performance quantification value of a certain performance of the target product when an acceleration stress is applied to the target product. For example, the acceleration stress may be a high temperature or a low temperature, and the multiple performance parameter values may be the current, voltage, power, etc. of the target product.

After the computer device obtains multiple performance parameter values of the target product in the accelerated test, it determines the association relationship among the performance parameter values. The association relationship includes an independent coexistence relationship and a backup relationship. For example, the independent coexistence relationship may be an independent or non-independent relationship among multiple performance parameter values. The backup relationship may be a non-backup relationship or a backup relationship among multiple performance parameter values.

The independent relationship among multiple performance parameter values means that the multiple performance parameter values of the target product are independent of each other, i.e., the change of one performance parameter value will not affect the change of another performance parameter value. The non-independent relationship among multiple performance parameter values means that the multiple performance parameter values of the target product are not independent of each other, i.e., the change of one performance parameter value will affect the change of another performance parameter value. The non-backup relationship among multiple performance parameter values means that the multiple performance parameter values of the target product do not reflect the same performance of the target product, i.e., one performance parameter value of the target product corresponds to one performance of the target product. The backup relationship among multiple performance parameter values means that the multiple performance parameter values of the target product reflect the same performance of the target product, i.e., multiple performance parameter values of the target product correspond to one performance of the target product. For example, multiple performance parameter values of a laptop are battery powered operating current and mains powered operating current. Both the battery powered operating current and the mains powered operating current reflect the power supply performance of the laptop.

In step 102, the computer device determines a reliability estimation model corresponding to the association relationship based on the association relationship, and according to the reliability estimation model and each performance parameter value, obtains a reliability function of multiple performance degradation corresponding to the target product.

In the embodiment of the present disclosure, the computer device determines the reliability estimation model corresponding to the association relationship based on the association relationship. Based on the association relationship among multiple performance parameter values, the reliability estimation model is classified as a non-backup coupling competition model, a backup coupling competition model, or a fusion competition model. When the reliability estimation model is a non-backup coupling competition model, the target product fails when any one of the multiple performance parameters of the target product degrades. When the reliability estimation model is a backup coupling competition model, the target product fails only when all of the multiple performance parameters of the target product with the backup relationship degrade. When the reliability estimation model is a fusion competition model, the non-backup coupling competition model and the backup coupling competition model coexist among multiple performance parameters of the target product. The computer device identifies the association relationship among multiple performance parameter values and selects the corresponding reliability estimation model based on the association relationship.

The reliability function R(t) of multiple performance degradation corresponding to the target product refers to the reliability rate of the target product, i.e., the ratio of non-failed products to the total number of the products at each time node under an acceleration stress. The reliability function R(t) of multiple performance degradation corresponding to the target product is used by the computer device to calculate the product reliability estimation index corresponding to the target product under a normal stress.

The computer device identifies the association relationship among multiple performance parameter values. After selecting the reliability estimation model corresponding to the association relationship based on the association relationship, the computer device further processes the multiple performance parameter values and substitutes them into the corresponding reliability estimation model. The computer device calculates the reliability function R(t) of multiple performance degradation corresponding to the target product.

In step 103, the computer device obtains a product reliability estimation index corresponding to the target product under normal stress according to the reliability function of multiple performance degradation.

The product reliability estimation index corresponding to the target product under the normal stress includes a mean time between failures MTBF' of the product, a failure rate function $\lambda'(t)$ of the product, and a failure rate $\lambda'$ of the product. The mean time between failures MTBF' refers to the mean time between failures of the product under the normal stress. The failure rate function $\lambda'(t)$ of the product refers to the failure rate function of the product under the normal stress, i.e., at a certain time node, the ratio of failed products to the total number of the products. If the target product life follows an exponential distribution function, the failure rate $\lambda'$ of the product refers to the failure rate of the product under the normal stress.

Based on the reliability function R(t) of multiple performance degradation, the computer device calculates the mean time between failures MTBF' of the product, the failure rate function $\lambda'(t)$ of the product, and the failure rate $\lambda'$ of the product corresponding to the target product under the normal stress.

In the embodiments of the present disclosure, the computer device further performs a product reliability estimation on a product based on the product reliability estimation index, and outputs an estimation report to a terminal device, such as a mobile phone. In this way, engineers can accurately and timely learn the status of the target product, such as the remaining service lift, based on the received estimation report, facilitating timely maintenance, replacement, and other operations on the target product.

It should be noted that in related technologies, it is often assumed that multiple performance parameters are independent of each other or that multiple performance parameters are not independent of each other, and there is a non-backup relationship among multiple performance parameters. The complex coupling competition situation where multiple performance parameters of the target product co-exist independently and non-independently of each other, without and with the backup relationship, is not considered. Therefore, this type of method has limited scope of application.

According to the above method for processing accelerated test data based on multiple performance degradation, multiple performance parameter values of the target product are obtained and the association relationship among the performance parameter values is determined. The association relationship includes an independent coexistence relationship and a backup relationship. Each performance parameter value is obtained by applying acceleration stress to the target product in the accelerated test. The reliability estimation model corresponding to the association relationship is determined based on the association relationship, and according to the reliability estimation model and each performance parameter value, the reliability function of multiple performance degradation corresponding to the target product is obtained. According to the reliability function of multiple performance degradation, the product reliability estimation index corresponding to the target product under a normal stress is obtained. Therefore, in the embodiment of the present disclosure, the reliability estimation model corresponding to the association relationship is determined based on the association relationship among multiple performance parameter values of the target product obtained in the accelerated test. The association relationship includes an independent coexistence relationship and a backup relationship. The association relationship includes, for example, an independent relationship, a non-independent relationship, a non-backup relationship, and a backup relationship among multiple performance parameter values. That is, in the embodiment of the present disclosure, the complex coupling competition relationships among the performance parameter values are fully considered during the reliability estimation process, making it closer to the real situation of actual product reliability estimation business and having a wide range of applications. Different reliability estimation models are selected according to different relationships, which improves the flexibility of accelerated test data processing based on multiple performance degradation.

Figure 2:
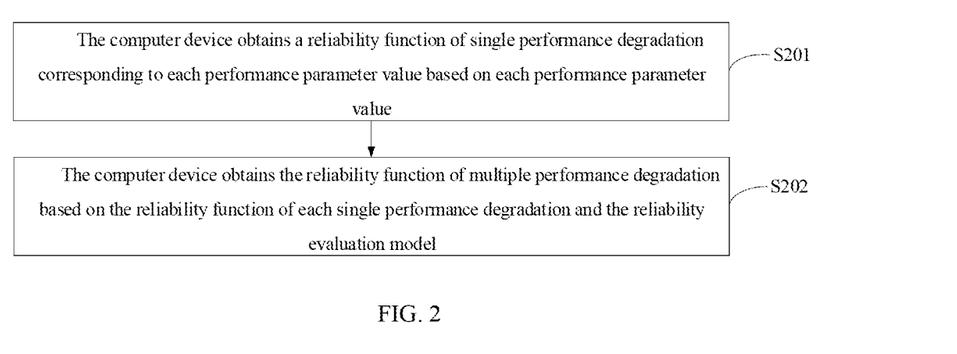
FIG. 2 is a schematic flow diagram of obtaining a reliability function of multiple performance degradation corresponding to a target product in another embodiment.

In an embodiment, as shown in FIG. 2, the embodiment involves a computer device obtaining the reliability function of multiple performance degradation corresponding to the target product according to the reliability estimation model and each performance parameter value. As shown in FIG. 2, the embodiment includes the following steps.

In step 201, the computer device obtains a reliability function of single performance degradation corresponding to each performance parameter value based on each performance parameter value.

In the embodiment of the present disclosure, the computer device calculates, by a gamma distribution function, the reliability function $R(t)$ of single performance degradation corresponding to each performance parameter value based on each performance parameter value $y(t)$ and a target time transition function $\rho(t)$.

The target time transition function $\rho(t)$ is selected by the computer device from multiple candidate time transition functions based on the performance parameter value and a preset selection condition. The computer device obtains the reliability function of multiple performance degradation based on the reliability function $R(t)$ of each single performance degradation and the reliability estimation model.

In step 202, the computer device obtains the reliability function of multiple performance degradation based on the reliability function of each single performance degradation and the reliability estimation model.

In the embodiment of the present disclosure, the computer device substitutes each reliability function of single performance degradation into the reliability function calculation formula corresponding to the reliability estimation model to obtain the reliability function of multiple performance degradation, based on each reliability function of single performance degradation and the selected reliability estimation model.

Reliability estimation models are classified into non-backup coupling competition models, backup coupling competition models and fusion competition models. These three types of models correspond to different function calculation formulas.

In the embodiment of the present disclosure, the computer device obtains the reliability function of multiple performance degradation corresponding to the target product based on the reliability estimation model and each performance parameter value. The complex coupling competition situation where multiple performance parameters of the target product co-exist independently and non-independently of each other, without and with backup relationships, is considered, and a non-backup coupling competition model, a backup coupling competition model and a fusion coupling competition model of multiple performance degradation are established. Under the corresponding model, the reliability function of multiple performance degradation corresponding to the target product is obtained, which improves the flexibility of accelerated test data processing based on multiple performance degradation.

Figure 3:
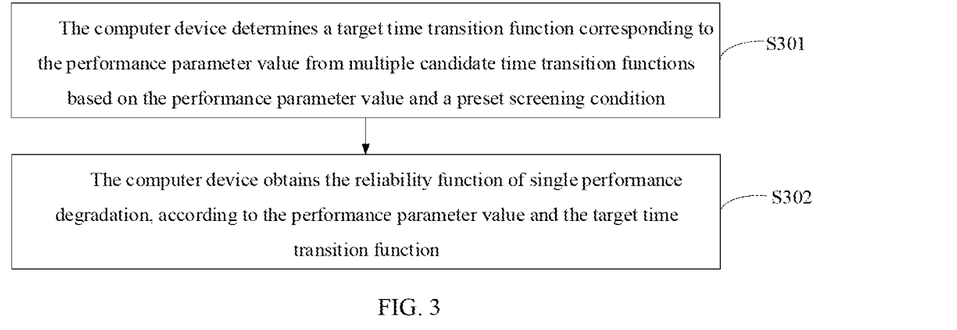
FIG. 3 is a schematic flow diagram of obtaining a reliability function of single performance degradation corresponding to each performance parameter value in another embodiment.

In an embodiment, referring to FIG. 3, the embodiment involves a computer device obtaining the reliability function of single performance degradation corresponding to each performance parameter value according to each performance parameter value, including the following steps.

In step 301, the computer device determines a target time transition function corresponding to the performance parameter value from multiple candidate time transition functions based on the performance parameter value and a preset selection condition.

Firstly, under an acceleration stress, the computer device establishes four candidate time transition functions, including:

$\rho(t)=t^{\alpha}$ $\rho(t)=a \times t^{b}$ $$\rho(t) = \exp(a \times t) - 1$$

$$\rho(t) = 1 - \exp(a \times t^b)$$

where $\rho(t)$ refers to the time transition function, t refers to the test time, and a and b refer to unknown parameters.

Therefore, the computer device determines a target time transition function corresponding to the performance parameter value from multiple candidate time transition functions based on the performance parameter value and a preset selection condition. It's assumed that the total number of the products in the accelerated test is N, the performance parameter value of the product corresponding to the test time/is y(t), the correlation coefficient between the time transition function $\rho(t)$ of the product i and the performance parameter value y(t) is $q_i$, the correlation coefficient $q_i$ refers to the linear relationship between the performance parameter value y(t) of the product and the time transition function $\rho(t)$ of the product, and the sum Q of correlation coefficients of N products is as follows:

$$Q = q_1 + q_2 + \ldots + q_i + \ldots + q_N.$$

For the four candidate time transition functions, the time transition function that maximizes the value of Q is selected and determined as the target time transition function corresponding to the performance parameter value. A larger value of (indicates a greater linear relationship between the performance parameter value y(t) of the product and the time transition function $\rho(t)$ of the product, so that the values of a and b that maximize the value of Q are the unknown parameter values sought. It's assumed that the sum Q of the correlation coefficients corresponding to the four time transition functions are Q1, Q2, Q3, and Q4 respectively. The time transition function corresponding to the largest value of Q is taken as the target time transition function $\rho(t)$ corresponding to the performance parameter value, where the performance parameter value varies linearly and/or nonlinearly with the time change represented by the target time transition function $\rho(t)$. Then, the computer device obtains the reliability function R(t) of single performance degradation based on the performance parameter value y(t) and the target time transition function $\rho(t)$.

In step 302, the computer device obtains the reliability function of single performance degradation according to the performance parameter value and the target time transition function.

The computer device calculates the reliability function R(t) of single performance degradation corresponding to each performance parameter value based on performance parameter value y(t) and the target time transition function $\rho(t)$.

The gamma distribution function is as follows:

$$\begin{cases} y(t) \sim G(c\rho(t), d) \\ d \sim G(e, f) \end{cases}$$

where under the acceleration stress, $\rho(t)$ refers to the time transition function of the product, and c, e, and f refer to unknown parameters. The maximum likelihood estimation method is used to obtain the values of the unknown parameters c, e, and f.

Then, under the acceleration stress, the computer device calculates the reliability function R(t) of single performance degradation of the target product as follows:

$$R(t) = H_{2c\rho(t), 2e}\left(\frac{eg}{cf\rho(t)}\right)$$

where g refers to the failure threshold, H(•) refers to the F distribution function, 2c$\rho$(t), 2e refers to the degree of freedom of the F distribution function, and $$\frac{eg}{cf\rho(t)}$$

refers to the independent variable of the F distribution function.

Under the acceleration stress, the computer device calculates the unreliability function F(t) of single performance degradation of the target product as follows:

$$F(t) = 1 - R(t).$$

It should be noted that in related technologies, it is often assumed that the degradation of performance parameters over time is linear, and the situation that the degradation of performance parameters over time is nonlinear is not considered. Nonlinear situations are considered in very few methods, but it is only assumed that the performance parameters degrade over time follows a specific function. Other possible function situations are not considered, and the functions that may be followed are not optimized. Therefore, the estimation accuracy of this type of method is not high.

In the embodiments of the present disclosure, the computer device obtains the reliability function of single performance degradation corresponding to each performance parameter value based on performance parameter values. The situation that the degradation of the performance parameters over time is non-linear is taken into account, and the time transition function is optimized, improving the applicability and accuracy of the method for processing accelerated test data based on multiple performance degradation.

Figure 4:
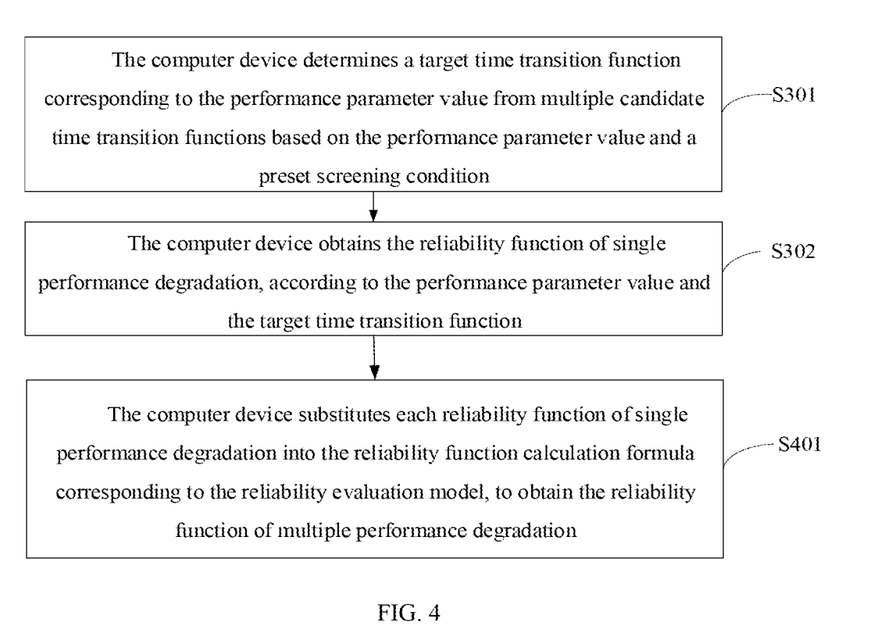
FIG. 4 is a schematic flow diagram of obtaining a reliability function of single performance degradation corresponding to each performance parameter value, and obtaining a reliability function of multiple performance degradations based on each reliability function of single performance degradation and the reliability estimation model in another embodiment.

In an embodiment, based on the embodiment shown in FIG. 3, as shown in FIG. 4, this embodiment involves a computer device obtaining a reliability function of multiple performance degradations based on the reliability function and each reliability estimation model of single performance degradation. Based on the embodiment shown in FIG. 3, as shown in FIG. 4, the process of the computer device obtaining the reliability function of multiple performance degradation based on each reliability function of single performance degradation and the reliability estimation model includes the following steps.

In step 401, the computer device substitutes each reliability function of single performance degradation into the reliability function calculation formula corresponding to the reliability estimation model to obtain the reliability function of multiple performance degradation.

In the embodiment of the present disclosure, the computer device substitutes each reliability function of single performance degradation into the reliability function calculation formula corresponding to the reliability estimation model to obtain the reliability function R(t) of multiple performance degradation through calculation.

When the reliability estimation model is a non-backup coupling competition model, the product fails when any one of the multiple performance parameters of the target product degrades. Assuming that the (j−1)-th performance parameter and the j-th performance parameter are not independent of each other, and the remaining performance parameters are independent of each other, then under the acceleration stress, the reliability function R(t) of multiple performance degradation of the target product for the computer device to obtain is:

$$R(t)=R_1(t) \times R_2(t) \times \ldots \times C(R_{j-1}(t),R_j(t);\theta) \times \ldots \times R_m(t).$$

When the reliability estimation model is a backup coupling competition model, the product fails only when all of the multiple performance parameters of the target product degrade. Assuming that the (j−1)-th performance parameter and the j-th performance parameter are not independent of each other, and the remaining performance parameters are independent of each other, then under the acceleration stress, the reliability function R(t) of multiple performance degradation of the target product for the computer device to obtain is as follows:

$$R(x)=1-[1-R_1(x)] \times [1-R_2(x)] \times \ldots \times [1-C(R_{j-1}(x),R_j(x);\theta)] \times \ldots \times [1-R_m(x)]$$

where $C(\bullet)$ refers to a connection function, $\theta$ refers to the unknown parameter of the connection function, and the connection function term $C(\bullet)$ represents the connection relationship between the performance parameter values that have a non-independent relationship among the performance parameter values. The value of the parameter $\theta$ can be obtained by selecting the corresponding connection function and fitting the solution. It should be noted that there are no specific limitations on which connection function is selected.

The computer device obtains the unreliability function F(t) of multiple performance degradation of the target product as follows:

$$F(t)=1-[1-F_1(t)] \times [1-F_2(t)] \times \ldots \times C(1-F_{j-1}(t),1-F_j(t);\theta) \times \ldots \times [1-F_m(t)].$$

When the reliability estimation model is a fusion competition model, the non-backup coupling competition model and the backup coupling competition model coexist in multiple performance parameters of the target product. It's assumed that there is a backup model between the first, second, third and fourth performance parameters, the second and third performance parameters are not independent of each other, and the remaining performance parameters are independent of each other. There is a non-backup model between the fifth to m-th performance parameters, the (j−1)-th and j-th performance parameters are not independent of each other, and the remaining performance parameters are independent of each other. Then under the acceleration stress, the reliability function R(t) of multiple performance degradation of the target product for the computer device to obtain is as follows:

$$R(t)=\{1-[1-R_1(t)] \times [1-C_1(R_2(t),R_3(t);\theta_1] \times [1-R_4(t)]\} \times R_5(t) \times \ldots \times C_2(R_{j-1}(t),R_j(t);\theta_2) \times \ldots \times R_m(t)$$

where $C_1(\bullet)$ and $C_2(\bullet)$ refer to connection functions, $\theta_1$ and $\theta_2$ refer to unknown parameters of the connection functions, the connection function terms $C_1(\bullet)$ and $C_2(\bullet)$ are configured to represent the connection relationships between the performance parameter values that have a non-independent relationship among the performance parameter values. The values of the parameters $\theta_1$ and $\theta_2$ can be obtained by selecting the corresponding connection function and fitting the solution. It should be noted that there are no specific limitations on which connection function is selected.

The computer device obtains the unreliability function F(t) of multiple performance degradation of the target product as follows:

$$F(t)=1-\{1-F_1(t) \times [1-C_1(1-F_2(t),1-F_3(t);\theta)] \times F_4(t)\} \times [1-F_5(t)] \times \ldots \times C_2(1-F_{j-1}(t),1-F_j(t);\theta) \times \ldots \times [1-F_m(t)].$$

In the embodiments of the present disclosure, the computer device substitutes each reliability function of single performance degradation into the reliability function calculation formula corresponding to the reliability estimation model to calculate the reliability function of multiple performance degradation. Different reliability estimation models correspond to different reliability function calculation formulas, which improves the flexibility of the method for processing accelerated test data based on multiple performance degradation. The connection function is used in the reliability function calculation formula, which reflects the connection relationship among performance parameter values of the non-independent relationship in performance parameter values, and improves the accuracy of the method for processing accelerated test data based on multiple performance degradation.

Figure 5:
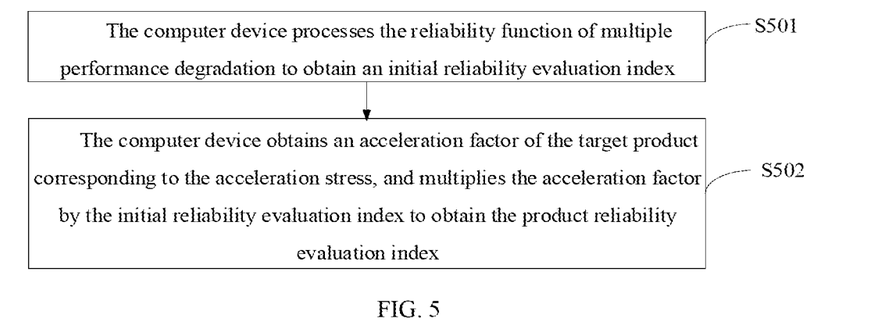
FIG. 5 is a schematic flow diagram of obtaining a product reliability estimation index corresponding to a target product under normal stress in another embodiment.

In an embodiment, as shown in FIG. 5, this embodiment involves a computer device obtaining the product reliability estimation index corresponding to the target product under normal stress based on the reliability function of multiple performance degradation, including the following steps.

In step 501, the computer device processes the reliability function of multiple performance degradation to obtain an initial reliability estimation index.

The initial reliability estimation index includes the mean time between failures MTBF of the product, the failure rate function $\lambda(t)$ of the product and the failure rate $\lambda$ of the product corresponding to the target product under acceleration stress.

The mean time between failures MTBF of the product for the computer device to obtain is as follows:

$$MTBF = \int_0^\infty R(t)dt$$

where the mean time between failures MTBF refers to the mean time between failures of the product corresponding to the target product under an acceleration stress.

The failure rate function $\lambda(t)$ of the product for the computer device to obtain is as follows:

$$\lambda(t) = -\frac{dR(t)}{dt} \times \frac{1}{R(t)}$$

where the failure rate function $\lambda(t)$ of the product refers to the failure rate function of the product corresponding to the target product under acceleration stress, i.e., the ratio of failed products to the total number of the products at a time node.

If the product life follows an exponential distribution function, the failure rate $\lambda$ of the product for the computer device to obtain is a constant as follows:

$$\lambda = 1 \bigg/ \int_0^\infty R(t)dt$$

where the failure rate $\lambda$ of the product refers to the failure rate of the product corresponding to the target product under acceleration stress.

In step 502, the computer device obtains an acceleration factor of the target product corresponding to the acceleration stress, and multiplies the acceleration factor by the initial reliability estimation index to obtain the product reliability estimation index.

The computer device obtains the acceleration factor of the target product corresponding to the acceleration stress, and the acceleration factor of the target product corresponding to the acceleration stress is J.

The mean time between failures MTBF' of the product for the computer device to obtain is as follows:

$$MTBF'=J \times MTBF$$

where the mean time between failures MTBF' of a product refers to the mean time between failures of the product corresponding to the target product under normal stress.

The failure rate function $\lambda$' (#) of the product for the computer device to obtain is as follows:

$$\lambda'(t)=J \times \lambda(t)$$

where the failure rate function $\lambda$'(t) of the product refers to the failure rate function of the product corresponding to the target product under normal stress, i.e., the ratio of failed products to the total number of the products at a time node.

If the product life follows the exponential distribution function, the failure rate $\lambda$' of the product for the computer device to obtain is as follows:

$$\lambda'=J \times \lambda$$

where the failure rate $\lambda$' of the product refers to the failure rate of the product corresponding to the target product under normal stress.

In the embodiments of the present disclosure, the computer device obtains the product reliability estimation index corresponding to the target product under normal stress through the acceleration factor, based on the reliability function of multiple performance degradation. The product reliability estimation index under normal stress includes the mean time between failures MTBF' of the product, the failure rate function $\lambda$'(t) of the product, and the failure rate $\lambda$' of the product. Based on these reliability estimation indexes, the reliability of the target product can be estimated quickly, the product development cycle can be shorted, and the development efficiency can be improved.

In an embodiment, the inventor performed accelerated test data processing on a product based on multiple performance degradation. This product has 6 performance parameters. The inventor conducted an accelerated test under an acceleration stress of a high temperature of 80° C., and analyzed the accelerated test data to estimate the reliability of the product.

The first performance parameter under the acceleration stress is analyzed. Parameter estimation and optimization are performed on its time transition functions to obtain the target time transition function as follows:

$$\rho(t)=1.32 \times t^{1.43}.$$

This performance parameter follows a gamma distribution as follows:

$$\begin{cases} y(t) \sim G(1.32 \times t^{1.43} \times c, d) \\ d \sim G(e, f) \end{cases}.$$

The values of parameters c, e and f are obtained by estimation, such that the reliability function $R_1(t)$ and unreliability function $F_1(t)$ of the performance degradation under the acceleration stress are obtained.

Similarly, the reliability functions and unreliability functions of the degradations of the 6 performances of the product under the acceleration stress are solved.

Under the acceleration stress, multiple performance parameters of the target product correspond to fusion competition models. There is a backup model among the first, second, and third performance parameters of the target product. The first and second performance parameters are coupled and non-independent, and first and second performance parameters as a whole are independent of the third performance parameter. There is a non-backup model among the fourth, fifth, and sixth performance parameters of the target product. The fourth and fifth performance parameters are coupled and non-independent, and the fourth and fifth performance parameters as a whole are independent of the sixth performance parameter.

Then, under the acceleration stress, the reliability function R(t) of multiple performance degradation of the target product is as follows:

$$R(t)=\{1-[1-C_1(R_1(t),R_2(t);\theta_1)] \times [1-R_3(t)]\} \times C_2(R_4(t), R_5(t);\theta_2) \times R_6(t).$$

Under the acceleration stress, the unreliability function F(t) of multiple performance degradation of the target product is as follows:

$$F(t)=1-\{1-[1-C_1(1-F_1(t),1-F_2(t);\theta_1)] \times F_3(t)\} \times C_2(1-F_4(t),1-F_5(t);\theta_2) \times [1-F_6(t)].$$

The mean time between failures MTBF of the target product under acceleration stress is as follows:

$$MTBF=\int R(t)dt=2572h.$$

The corresponding acceleration factor J of the target product at the high temperature of 80° C. is 9.5, then under normal stress, the mean time between failures MTBF' of the product corresponding to the target product is as follows:

$$MTBF'=J \times MTBF=24434h.$$

It should be understood that although the various steps in the flowcharts of the embodiments described above are shown in a sequence indicated by the arrows, these steps are not necessarily executed in the order indicated by the arrows. Unless otherwise specified in this document, there is no strict order limitation on the execution of these steps, which can be executed in other orders. Moreover, at least some of the steps in the flowcharts of the embodiments described above may include multiple steps or stages, which may not necessarily be completed at the same time, but can be executed at different times. The execution order of these steps or stages may also not be sequential, but may alternate with at least some of the steps or stages in other steps.

Based on the same inventive concept, embodiments of the present disclosure also provide an apparatus for processing accelerated test data based on multiple performance degradation for implementing the method for processing accelerated test data based on multiple performance degradation described above. The solutions provided by the apparatus for solving the problem are similar to those described in the method described above, so the specific limitations in the one or more embodiments of the apparatus for processing accelerated test data based on multiple performance degradation provided below may be referred to the limitations of the method for processing accelerated test data based on multiple performance degradation described above, and will not be repeated herein.

Figure 6:
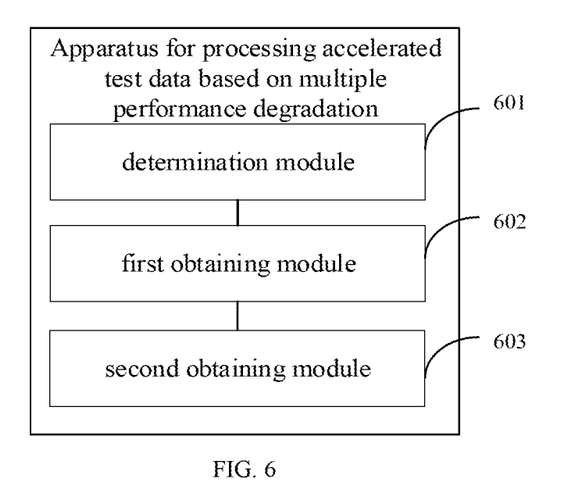
FIG. 6 is a block diagram of a structure of an apparatus for processing accelerated test data based on multiple performance degradation in an embodiment.

In an embodiment, as shown in FIG. 6, an apparatus for processing accelerated test data based on multiple performance degradation is provided, including a determination module 601, a first obtaining module 602, and a second obtaining module 603.

The determination module 601 is configured to obtain multiple performance parameter values of a target product, and determine an association relationship among the performance parameter values, the association relationship including an independent coexistence relationship and a backup relationship, and each performance parameter value being obtained by applying acceleration stress to the target product in the accelerated test.

The first obtaining module 602 is configured to determine a reliability estimation model corresponding to the association relationship based on the association relationship, and according to the reliability estimation model and each performance parameter values, obtain a reliability function of multiple performance degradation corresponding to the target product.

The second obtaining module 603 is configured to obtain, according to the reliability function of multiple performance degradation, a product reliability estimation index corresponding to the target product under normal stress.

In an embodiment, the first obtaining module 602 includes a first obtaining unit and a second obtaining unit.

The first obtaining unit is configured to obtain, according to each performance parameter value, a reliability function of single performance degradation corresponding to each performance parameter value.

The second obtaining unit is configured to obtain, according to each reliability function of single performance degradation and the reliability estimation model, the reliability function of multiple performance degradation.

In an embodiment, the first obtaining module 602 includes a determination unit and a third obtaining unit.

The determination unit is configured to determine, according to the performance parameter value and a preset selection condition, a target time transition function corresponding to the performance parameter value from multiple candidate time transition functions. The performance parameter value changes linearly and/or non-linearly with a time change represented by the target time transition function.

The third obtaining unit is configured to obtain the reliability function of single performance degradation according to the performance parameter value and the target time transition function.

In an embodiment, the first obtaining module 602 includes a first calculation unit.

The first calculation unit is configured to substitute each reliability function of single performance degradation into the reliability function calculation formula corresponding to the reliability estimation model to obtain the reliability function of multiple performance degradation. The reliability function calculation formula includes a connection function term, and the connection function term represents the connection relationship among the performance parameter values that have a non-independent relationship in the performance parameter values.

In an embodiment, the second obtaining module 603 includes a second calculation unit and a fourth obtaining unit.

The second calculation unit is configured to process the reliability function of multiple performance degradation to obtain an initial reliability estimation index.

The fourth obtaining unit is configured to obtain an acceleration factor of the target product corresponding to the acceleration stress, and multiply the acceleration factor by the initial reliability estimation index to obtain the product reliability estimation index.

The above apparatus for processing accelerated test data based on multiple performance degradation may be implemented in whole or in part by software, hardware, and combinations thereof. Each of the above-described modules may be embedded in hardware in or independent of a processor in the computer device, or may be stored in software in a memory in the computer device so that the processor can be called to perform operations corresponding to each of the above-described modules.

Figure 7:
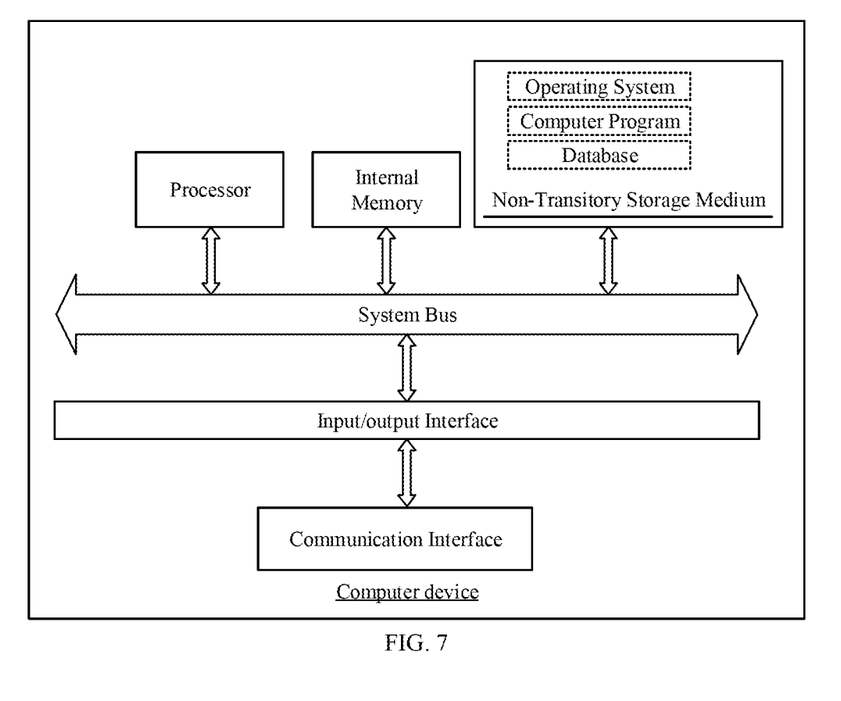
FIG. 7 is a schematic diagram of an internal configuration of a computer device in an embodiment.

In an embodiment, a computer device is provided. The computer device may be a server, a schematic diagram of an internal configuration of which is shown in FIG. 7. The computer device includes a processor, a memory, an input/output interface (Input/Output, or I/O for short), and a communication interface. The processor, the memory and the Input/Output interface are connected through a system bus, and the communication interface is connected to the system bus through the Input/Output interface. The processor of the computer device is used to provide computing and control capabilities. The memory of the computer device includes a non-transitory storage medium and an internal memory. The non-transitory storage medium stores an operating system, a computer program, and a database. The internal memory provides an environment for the operation of the operating system and the computer program in the non-transitory storage medium. The database of the computer device is used to store data. The input/output interface of the computer device is used to exchange information between the processor and an external device. The communication interface of the computer device is used to communicate with an external terminal through a network connection. The computer program is executed by the processor to implement the method for processing accelerated test data based on multiple performance degradation.

It will be understood by those skilled in the art that the structure illustrated in FIG. 7 is only a block diagram of a portion of the structure related to the solution of the present disclosure, and does not constitute a limitation on the computer device to which the solution of the present disclosure is applied. The specific computer device may include more or less components than those shown in the figures, or may combine certain components, or have a different component arrangement.

In an embodiment, a computer device is provided, including a memory and a processor. A computer program is stored in the memory. The processor, when executing the computer program, implements the following steps:

obtaining multiple performance parameter values of a target product, and determining an association relationship among the performance parameter values, the association relationship including an independent coexistence relationship and a backup relationship, and each performance parameter value being obtained by applying acceleration stress to the target product in an accelerated test;

determining a reliability estimation model corresponding to the association relationship based on the association relationship, and according to the reliability estimation model and each performance parameter value, obtaining a reliability function of multiple performance degradation corresponding to the target product; and obtaining, according to the reliability function of multiple performance degradation, a product reliability estimation index corresponding to the target product under normal stress.

In an embodiment, the processor also implements the following steps when executing the computer program: obtaining, according to each performance parameter value, a reliability function of single performance degradation corresponding to each performance parameter value; and obtaining, according to each reliability function of single performance degradation and the reliability estimation model, the reliability function of multiple performance degradation.

In an embodiment, the processor also implements the following steps when executing the computer program: determining, according to the performance parameter value and a preset selection condition, a target time transition function corresponding to the performance parameter value from multiple candidate time transition functions, the performance parameter value changing linearly and/or non-linearly with a time change represented by the target time transition function; and obtaining the reliability function of single performance degradation according to the performance parameter value and the target time transition function.

In an embodiment, the processor also implements the following steps when executing the computer program: substituting each reliability function of single performance degradation into the reliability function calculation formula corresponding to the reliability estimation model to obtain the reliability function of multiple performance degradation. The reliability function calculation formula includes a connection function term, and the connection function term represents the connection relationship among the performance parameter values that have a non-independent relationship in the performance parameter values.

In an embodiment, the reliability estimation model includes a non-backup coupling competition model, a backup coupling competition model, or a fusion competition model.

In an embodiment, the processor also implements the following steps when executing the computer program: processing the reliability function of multiple performance degradation to obtain an initial reliability estimation index; and obtaining an acceleration factor of the target product corresponding to the acceleration stress, and multiplying the acceleration factor by the initial reliability estimation index to obtain the product reliability estimation index.

In an embodiment, a computer-readable storage medium is provided with a computer program stored thereon. When the computer program is executed by a processor, the following steps are implemented: obtaining multiple performance parameter values of a target product, and determining an association relationship among the performance parameter values, the association relationship including an independent coexistence relationship and a backup relationship, and each performance parameter value being obtained by applying acceleration stress to the target product in an accelerated test; determining a reliability estimation model corresponding to the association relationship based on the association relationship, and according to the reliability estimation model and each performance parameter value, obtaining a reliability function of multiple performance degradation corresponding to the target product; and obtaining, according to the reliability function of multiple performance degradation, a product reliability estimation index corresponding to the target product under normal stress.

In an embodiment, when the computer program is executed by the processor, the following steps are also implemented: obtaining, according to each performance parameter value, a reliability function of single performance degradation corresponding to each performance parameter value; and obtaining, according to each reliability function of single performance degradation and the reliability estimation model, the reliability function of multiple performance degradation.

In an embodiment, when the computer program is executed by the processor, the following steps are also implemented: determining, according to the performance parameter value and a preset selection condition, a target time transition function corresponding to the performance parameter value from multiple candidate time transition functions, the performance parameter value changing linearly and/or non-linearly with a time change represented by the target time transition function; and obtaining the reliability function of single performance degradation according to the performance parameter value and the target time transition function.

In an embodiment, when the computer program is executed by the processor, the following steps are also implemented: substituting each reliability function of single performance degradation into the reliability function calculation formula corresponding to the reliability estimation model to obtain the reliability function of multiple performance degradation. The reliability function calculation formula includes a connection function term, and the connection function term represents the connection relationship among the performance parameter values that have a non-independent relationship in the performance parameter values.

In an embodiment, the reliability estimation model includes a non-backup coupling competition model, a backup coupling competition model, or a fusion competition model.

In an embodiment, when the computer program is executed by the processor, the following steps are also implemented: processing the reliability function of multiple performance degradation to obtain an initial reliability estimation index; and obtaining an acceleration factor of the target product corresponding to the acceleration stress, and multiplying the acceleration factor by the initial reliability estimation index to obtain the product reliability estimation index.

In an embodiment, a computer program product is provided, including a computer program. When the computer program is executed by a processor, the following steps are performed: obtaining multiple performance parameter values of a target product, and determining an association relationship among the performance parameter values, the association relationship including an independent coexistence and a backup relationship, and each performance parameter value being obtained by applying acceleration stress to the target product in an accelerated test; determining a reliability estimation model corresponding to the association relationship based on the association relationship, and according to the reliability estimation model and each performance parameter value, obtaining a reliability function of multiple performance degradation corresponding to the target product; and obtaining, according to the reliability function of multiple performance degradation, a product reliability estimation index corresponding to the target product under normal stress.

In an embodiment, the computer program, when executed by the processor, also causes implements the following steps: obtaining, according to each performance parameter value, a reliability function of single performance degradation corresponding to each performance parameter value; and obtaining, according to each reliability function of single performance degradation and the reliability estimation model, the reliability function of multiple performance degradation.

In an embodiment, the computer program, when executed by the processor, also implements the following steps: determining, according to the performance parameter value and a preset screening condition, a target time transition function corresponding to the performance parameter value from multiple candidate time transition functions, the performance parameter value changing linearly and/or non-linearly with a time change represented by the target time transition function; obtaining the reliability function of single performance degradation, according to the performance parameter value and the target time transition function.

In an embodiment, when the computer program is executed by the processor, the following steps are also implemented: substituting each reliability function of single performance degradation into the reliability function calculation formula corresponding to the reliability estimation model to obtain the reliability function of multiple performance degradation. The reliability function calculation formula includes a connection function term, and the connection function term is configured to represent the connection relationship among the performance parameter values that have a non-independent relationship in the performance parameter values.

In an embodiment, the reliability estimation model includes a non-backup coupling competition model, a backup coupling competition model, or a fusion competition model.

In an embodiment, when the computer program is executed by the processor, the following steps are also implemented: processing the reliability function of multiple performance degradation to obtain an initial reliability estimation index; and obtaining an acceleration factor of the target product corresponding to the acceleration stress, and multiplying the acceleration factor by the initial reliability estimation index to obtain the product reliability estimation index.

It should be noted that the user information (including but not limited to user device information, user personal information, etc.) and data (including but not limited to data used for analysis, stored data, displayed data, etc.) involved in the present disclosure are those authorised by the user or sufficiently authorised by the parties. The collection, use and processing of the relevant data need to comply with the relevant laws, regulations and standards of the relevant countries and regions.

Those of ordinary skill in the art can understand that all or part of the processes in the methods of the above embodiments can be completed by instructing relevant hardware through a computer program. The computer program can be stored in a non-volatile computer-readable storage. In the media, when executed, the computer program may include the processes of the above method embodiments. Any reference to memory, database or other media used in the embodiments provided in the present disclosure may include at least one of non-volatile and volatile memory. Non-volatile memory can include read-only memory (ROM), magnetic tape, floppy disk, flash memory, optical memory, high-density embedded non-volatile memory, resistive memory (ReRAM), magnetic variable memory (Magnetoresistive Random Access Memory (MRAM), ferroelectric memory (Ferroelectric Random Access Memory, FRAM), phase change memory (Phase Change Memory, PCM), graphene memory, etc. Volatile memory may include random access memory (Random Access Memory, RAM) or external cache memory, etc. By way of illustration and not limitation, RAM can be in many forms, such as static random access memory (Static Random Access Memory, SRAM) or dynamic random access memory (Dynamic Random Access Memory, DRAM). The databases involved in the various embodiments provided in the present disclosure may include at least one of a relational database and a non-relational database. Non-relational databases may include blockchain-based distributed databases, etc., but are not limited thereto. The processors involved in the various embodiments provided in the present disclosure may be general-purpose processors, central processing units, graphics processors, digital signal processors, programmable logic devices, quantum computing-based data processing logic devices, etc., and are not limited to this.

The technical features of the above embodiments can be combined in any way. To simplify the description, not all possible combinations of the technical features in the above embodiments are described. However, as long as there is no contradiction in the combination of these technical features, all possible combinations should be used. It is considered to be within the scope of this manual.

The above-described embodiments only express several implementation modes of the present disclosure, and their descriptions are relatively specific and detailed, but should not be construed as limiting the patent scope of the present disclosure. It should be noted that, for those of ordinary skill in the art, several modifications and improvements can be made without departing from the concept of the present disclosure, and these all fall within the protection scope of the present disclosure. Therefore, the scope of protection of the present disclosure should be determined by the appended claims.

What is claimed is:

1. A computer device comprising a memory and a processor, the memory storing a computer program, wherein the processor, when executing the computer program, performs a method for processing accelerated test data based on multiple performance degradation, and the method comprises:

obtaining multiple performance parameter values of a target product, and determining an association relationship among the performance parameter values, the association relationship comprising an independent coexistence relationship and a backup relationship, the performance parameter values being obtained by applying an acceleration stress to the target product in an accelerated test;

determining a reliability estimation model corresponding to the association relationship based on the association relationship, and according to the reliability estimation model and each of the performance parameter values, obtaining a reliability function of multiple performance degradation corresponding to the target product, the reliability estimation model comprising a non-backup coupling competition model, a backup coupling competition model, or a fusion competition model; and obtaining, according to the reliability function of multiple performance degradation, a product reliability estimation index corresponding to the target product under a normal stress, the product reliability estimation index comprising a mean time between failures of the product, a failure rate function of the product and a failure rate of the product;

wherein according to the reliability estimation model and each of the performance parameter values, obtaining the reliability function of multiple performance degradation corresponding to the target product, comprises:

determining, according to the performance parameter value and a preset selection condition, a target time transition function corresponding to the performance parameter value from multiple candidate time transition functions, the performance parameter value changing linearly and/or non-linear with a time change represented by the target time transition function;

obtaining, by a gamma distribution function, a reliability function of single performance degradation based on the performance parameter value and the target time transition function; and obtaining, according to each reliability function of single performance degradation and the reliability estimation model, the reliability function of multiple performance degradation;

wherein an expression of the gamma distribution function is as follows:

$$\begin{cases} y(t) \sim G(c\rho(t), d) \\ d \sim G(e, f) \end{cases}$$

where y(t) represents each performance parameter value, ρ(t) represents the target time transition function, and c, e, and f represent unknown parameters to be solved; and wherein an expression of the reliability function of single performance degradation of the target product is as follows:

$$R(t) = H_{2c\rho(t), 2e}\left(\frac{eg}{cf\rho(t)}\right)$$

where R(t) represents the reliability function of single performance degradation, g represents a failure threshold, H(•) represents a F distribution function, 2cρ(t), 2e represents a degree of freedom of the F distribution function, and $$\frac{eg}{cf\rho(t)}$$

represents an independent variable of the F distribution function.

2. The computer device according to claim 1, wherein obtaining, according to each reliability function of single performance degradation and the reliability estimation model, the reliability function of multiple performance degradation comprises:

substituting each reliability function of single performance degradation into a reliability function calculation formula corresponding to the reliability estimation model to obtain the reliability function of multiple performance degradation, wherein the reliability function calculation formula comprises a connection function, the connection function being configured to represent a connection relationship among the performance parameter values that have a non-independent relationship in the multiple performance parameter values.

3. The computer device according to claim 1, wherein obtaining, according to the reliability function of multiple performance degradation, the product reliability estimation index corresponding to the target product under the normal stress comprises:

processing the reliability function of multiple performance degradation to obtain an initial reliability estimation index; and obtaining an acceleration factor of the target product corresponding to the acceleration stress, and multiplying the acceleration factor by the initial reliability estimation index to obtain the product reliability estimation index.

4. The computer device according to claim 1, wherein the failure rate function is configured as a ratio of failed products to a total number of products at a time node under the normal stress.

5. An apparatus for processing accelerated test data based on multiple performance degradation, the apparatus comprising a processor configured to:

obtain multiple performance parameter values of a target product and determine an association relationship among the performance parameter values, the association relationship comprising an independent coexistence relationship and a backup relationship, each performance parameter value being obtained by applying an acceleration stress to the target product in an accelerated test;

determine a reliability estimation model corresponding to the association relationship based on the association relationship, and according to the reliability estimation model and each performance parameter value, obtain a reliability function of multiple performance degradation corresponding to the target product, the reliability estimation model comprising a non-backup coupling competition model, a backup coupling competition model, or a fusion competition model; and obtain, according to the reliability function of multiple performance degradation, a product reliability estimation index corresponding to the target product under a normal stress, the product reliability estimation index comprising a mean time between failures of the product, a failure rate function of the product and a failure rate of the product;

wherein the processor is further configured to:

determine, according to each performance parameter value and a preset selection condition, a target time transition function corresponding to the performance parameter value from multiple candidate time transition functions, the performance parameter value changing linearly and/or non-linear with a time change represented by the target time transition function;

obtain, by a gamma distribution function, a reliability function of single performance degradation based on the performance parameter value and the target time transition function; and obtain, according to each reliability function of single performance degradation and the reliability estimation model, the reliability function of multiple performance degradation;

wherein an expression of the gamma distribution function is as follows:

$$\begin{cases} y(t) \sim G(c\rho(t), d) \\ d \sim G(e, f) \end{cases}$$

wherein y(t) represents each performance parameter value, ρ(t) represents the target time transition function, and c, e, and f represent unknown parameters to be solved; and wherein an expression of the reliability function of single performance degradation of the target product is as follows:

$$R(t) = H_{2c\rho(t), 2e}\left(\frac{eg}{cf\rho(t)}\right)$$

wherein R(t) represents the reliability function of single performance degradation, g represents a failure threshold, H(•) represents a F distribution function, 2cρ(t), 2e represents a degree of freedom of the F distribution function, and $$\frac{eg}{cf\rho(t)}$$

represents an independent variable of the F distribution function.

6. The apparatus according to claim 5, wherein the processor is further configured to:

substitute each reliability function of single performance degradation into a reliability function calculation formula corresponding to the reliability estimation model to obtain the reliability function of multiple performance degradation, wherein the reliability function calculation formula comprises a connection function, the connection function being configured to represent a connection relationship among the performance parameter values that have the non-independent relationship in the multiple performance parameter values.

7. The apparatus according to claim 5, wherein the processor is further configured to:

process the reliability function of multiple performance degradation to obtain an initial reliability estimation index; and obtain an acceleration factor of the target product corresponding to the acceleration stress, and multiply the acceleration factor by the initial reliability estimation index to obtain the product reliability estimation index.

* * * * *